United States Patent [19]

Holmes-Farley et al.

[11] Patent Number: 5,139,601
[45] Date of Patent: Aug. 18, 1992

[54] METHOD FOR METAL BONDING

[75] Inventors: Stephen R. Holmes-Farley, Raleigh; Lynn C. Yanyo, Cary, both of N.C.; Anna M. Thuer, Erie, Pa.

[73] Assignee: Lord Corporation, Cary, N.C.

[21] Appl. No.: 507,224

[22] Filed: Apr. 11, 1990

[51] Int. Cl.$^5$ .............................. B05D 3/10; C09J 5/02
[52] U.S. Cl. .................... 156/329; 427/435; 427/387; 427/388.1; 106/287.16
[58] Field of Search ............ 156/329; 427/435, 387, 427/388.1; 106/287.16; 428/447

[56] References Cited

U.S. PATENT DOCUMENTS

| | | | |
|---|---|---|---|
| 4,147,685 | 4/1979 | Smith, Jr. ...................... | 427/407.1 X |
| 4,179,537 | 12/1979 | Rykowski .................... | 106/287.16 X |
| 4,356,233 | 10/1982 | Lange et al. ................. | 428/447 X |
| 4,439,239 | 3/1984 | Greigger et al. .............. | 106/287.16 |
| 4,605,446 | 8/1986 | Isozaki ....................... | 106/287.16 X |
| 4,623,591 | 11/1986 | Pike ........................... | 156/314 X |
| 4,624,870 | 11/1986 | Anthony ...................... | 427/387 |

OTHER PUBLICATIONS

Neufeldt et al., "Webster's New World Dictionary", Third College Edition, Simon & Shuster, 1988, p. 699.
"Silane Coupling Agents", Dow Corning Corporation, 1981.

*Primary Examiner*—Michael W. Ball
*Assistant Examiner*—Francis J. Lorin

[57] ABSTRACT

A method for bonding a metal substrate to a similar or dissimilar substrate by first applying a primer coating to the surface of the metal substrate and then bonding the primed metal substrate to the other substrate. At least part of the primer coating is composed of a uniform, ultra-thin film that is formed by immersing, prior to bonding, the metal substrate in a solution that has undergone substantially no polymer growth. The solution contains at least one hydrolyzable metal alkoxide of a polymer network-forming cation, water, a solvent and a base. The metal substrate is allowed to react with the solution for a time sufficient to form in situ an ultra-thin film on the metal substrate.

16 Claims, No Drawings

METHOD FOR METAL BONDING

BACKGROUND OF THE INVENTION

This invention relates to improvements in the bonding of metal substrates to similar or dissimilar substrates. More particularly, the invention is directed to metal to metal or metal to rubber bonding using as a primer certain uniform, ultra-thin coatings prepared in situ by sol-gel processing.

In the adhesive bonding of metal to metal or rubber to metal, a primer is usually required so as to insure the formation of a strong adhesive bond. Furthermore, in many applications the primers must also confer corrosion protection. In yet other applications, the primers must be sufficiently flexible to accommodate metal forming operations without loss of metal to primer adhesion, environmental resistance, thermal or chemical degradation and anodic or cathodic deterioration. In formulating primer compositions which possess the foregoing properties, the formulator must also consider the requirements that the primer must not only form a strong adhesive bond with the final or cover coating but also enhance the bonding between the adhesive and the metal.

Silane-based adhesion promoters are commonly employed in the prior art as primers in metal to metal or metal to rubber adhesive bonding. Unfortunately, these silane-based adhesion promoters fail to provide corrosion protection at or under the bond line unless the metal surface(s) is first pre-treated as by anodizing, phosphatizing, alodizing and the like. Corrosion prevention at the bond line is desirable inasmuch as it leads to enhanced environmental resistance.

It is an object of the invention, therefore, to bond metal substrates to similar or dissimilar substrates using a primer coating that provides increased primary adhesion and environmental resistance when used with commercial adhesives.

Another object of the invention is to provide adhesively-bonded assemblies of metal to similar or dissimilar substrates whose adhesive bonds exhibit strong resistance to corrosion, heat, water, humidity and chemicals.

A further object of the invention is to provide primers for the bonding of metal to similar or dissimilar substrates which provide enhanced primary adhesion and corrosion protection at or under the bond line without the necessity of first pre-treating the metal surface.

SUMMARY OF THE INVENTION

These and other objects are obtained by an improvement in the bonding of a metal substrate to a similar or dissimilar substrate wherein a primer coating is first applied to at least one metal substrate surface and the similar or dissimilar substrate is then bonded to the primer-coated metal substrate surface using a bonding adhesive, said improvement comprising using as at least part of the primer coating, a coating comprised of a uniform, ultra-thin film formed by immersing, prior to bonding, said metal substrate in a solution comprising at least one hydrolyzable metal alkoxide of a polymeric network-forming cation, water, a solvent and a base, said solution having undergone substantially no polymer growth, for a time sufficient to form in situ said film on said substrate.

In another embodiment of the invention, a coupling agent which promotes adhesion of the resulting film coating to the bonding adhesive as by, for instance, covalent bonding, is included in the solution. A particular preferred coupling agent is a dissimilar hydrolyzable and condensable organometallic compound of a polymeric networking-forming cation, wherein the organo moiety of said dissimilar compound promotes said adhesion to the bonding adhesive and wherein the dissimilar organometallic compound in the solution has a reactivity, defined by the rate of hydrolysis and condensation, sufficiently less than said other hydrolyzable metal alkoxide in said solution, so that it is the last to hydrolyze and condense and to thereby form a thin coating that constitutes the external layer of said primer coating.

It is important to appreciate that the method of the invention differs from prior art sol-gel processes in that in the latter the coating composition is permitted to complete a certain polymer growth stage, short of gelation, before it is applied. Unlike prior art processes, in the method of the invention the metal substrate or substrates is immersed in the defined coating composition before it has undergone any substantial growth. This is conveniently accomplished by simply immersing the substrate immediately after the components of the coating composition are mixed. Alternatively, if convenient mixing means are available, the coating composition can be formulated while in the presence of the metal substrate.

The result is a surprisingly complete and uniform coating that is invisible to the unaided eye and that has few discernible features other than those of the substrate in scanning electron microscopy at 10,000 to 100,000 X. Under typical reaction conditions it takes less than 30 minutes for the coating to reach its maximum thickness of about 400 to 700 Å as determined by ellipsometry. Also, it has been surprisingly found that the ability of the coating to provide environmental resistance, e.g., to prevent corrosion of the underlying substrate, does not seem to be directly related to the thickness of the coating. Maximum corrosion protection normally is unexpectedly reached when the coating is significantly less than 100 Å thick. Without being bound to any hypothesis, it is believed that the protection is actually being provided by a reaction layer formed by reaction of the alkoxide and the active hydrogen-containing surface of the substrate. For example, where the metal alkoxide is silicon alkoxide and the substrate aluminum, the reaction layer will be aluminosilicate. Further coating material that builds up above this reaction layer provides little additional protection. This hypothesis is supported by data obtained by corrosion testing of samples with multiple coatings.

The reason why the time between formulating the coating solution and treating the substrate of interest is critical is not known for certain, but it is believed that undue delay between formulation and immersion results in polymer growth, i.e, polymerization of the monomers, into highly branched networks or colloids which are less reactive towards the surface to be coated. Consequently, irregular and permeable coatings exhibiting less than satisfactory environmental resistance are formed. Immersing the substrate to be coated immediately or shortly after formulation of the coating solution, that is, before it has had an opportunity to undergo this polymer growth, allows the metal alkoxide monomer or monomers in their more reactive state to undergo reaction with the active hydrogen containing surface of the metal substrate to be coated and thereby form the uniform, impermeable reaction layer discussed above. While it is preferred that the immersion of the substrate be effected immediately after formulation of the coating solution, brief delay of up to no more than about ten minutes is usually permissible.

Another critical feature of the method by which the primer coating of the invention is formed resides in the use of a base as the catalyst for the sol-gel process involved. According to the literature (see, for example, "Better Ceramics Through Chemistry," *Materials Research Society Symposia Proceedings,* Vol. 32, 1984; edited by Brinker, C. J.; Clark, D. E; Ulrich, D. R.) acid catalyzed sol-gel reactions in coating methods are preferred since they lead to polymeric materials that can result in more densely packed, tighter coatings while the base catalyzed reactions lead to more branched networks. Surprisingly, use of acid catalysts in the method of the present invention fails to provide coatings exhibiting significant corrosion protection.

Illustrative of suitable base catalysts that can be used in the method of the invention are ammonium hydroxide, alkali metal hydroxides such as sodium hydroxide, alkaline earth metal hydroxides such as barium hydroxide and calcium hydroxide and amine bases such as cyclohexylamine. The preferred base catalysts are ammonium hydroxide and equivalent weak bases. The amount of base employed will vary depending upon the particular components selected but will always be present in a catalytic amount. In general, the base will be present in an amount that provides a coating solution having a pH of 7.5-8.5, preferably about 8.0.

The metal alkoxide, solutions of which are employed in the method of the invention, are the hydrolyzable metal alkoxides of a polymeric network-forming cation. Such alkoxides include those of the metals of Group II, III and IV of the Periodic Table, as well as the transition metals and other multivalent (e.g., +3, +4, +5, etc.) metals whose alkoxides form three-dimensional polymeric networks upon hydrolysis. Preferred amongst such metals are silicon, boron, zirconium, titanium, aluminum and other ceramic-type materials. Exemplary of suitable metal alkoxides are metal alkoxides having alkyl groups of 1 to 4 carbon atoms or higher. If desired, mixtures of metal alkoxides can be used to tailor the properties of the coating film to the requirements of the application.

The preferred metal alkoxides of the present invention correspond to the formula:

wherein M is a metal as described above; Z is —H or —R or —CR

herein R is alkyl, preferably of 1 to 15 carbon atoms or aryl, preferably of 6 to 20 carbon atoms; $R^1$ is an organic moiety, preferably an alkyl or aryl of 1 to 25 carbon atoms, unsubstituted or substituted with non-interfering substituents such as amino, halo or like groups; n is an integer of 1 to 4; and m is 4−n. The metal alkoxides of the present invention can also be di-metaloxy alkoxides such as di-s-butoxyaluminoxytriethoxy silane or dis-butoxytitanoxytriethoxysilane.

The preferred metal alkoxides are silicon alkoxides such as tetramethoxysilane, tetraethoxysilane, tetrapropoxysilane, tetrabutoxysilane and the like. Particularly preferred is tetraethoxysilane (TEOS).

The solvents used in the aqueous coating solution of the invention are typically lower alkanols of 1 to 4 carbon atoms but the choice of solvent is only limited in that it must allow for the co-existence of metal alkoxide, water and base catalyst in a single phase. In all cases, the amount of solvent should be sufficient to solubilize the metal alkoxide monomer. Typical solvents include ethanol, t-butanol, acetone and methylethylketone.

The presence of water in the coating solution is necessary for the reaction to take place. In most instances, a ratio of solvent to water of about 5:1 (volume:volume) provides acceptable protective coatings.

The metal substrates that can be treated with the coating solutions can be any substrate that contains active hydrogens on its surface. Most metals, for example, will have a thin surface layer of oxide which eventually provides the hydroxy groups possessing the active hydrogens that ensure reaction with the metal alkoxide monomers. Thus, the invention has particular applicability to the coating of metal substrates such as aluminum, iron, copper and nickel. The metal surfaces can be part of an integral structure or simply a metal layer deposited on a dissimilar substrate. In certain cases, e.g., steel, it may be necessary to preliminarily etch the metal surface of the coating.

The composition of the coating solution will vary depending on the particular components selected and the intended application, but will generally comprise about 0.0001 to 30 parts by volume metal alkoxide, 20 to 95 parts by volume solvent, 1 to 60 parts by volume water and 0.01 to 3 parts by volume of base catalyst.

A preferred formulation comprises 6 parts by volume metal alkoxide, 70 parts by volume solvent, 27 parts by volume water and 3 parts by volume concentrated ammonium hydroxide.

The coating solution is conveniently formulated by diluting the solvent with the water and mixing in the base. The metal alkoxide is then added to the resulting solution and the resulting coating solution is vigorously mixed.

Coating of the desired substrate is accomplished by immersing the metal substrate or substrates in the coating solution immediately after formulation or shortly thereafter and allowing the substrate to remain immersed until a coating of desired thickness has formed The immersion can conveniently be conducted at room temperature but elevated temperatures within the range of 0° to 100° C. can be employed if desired. After a few minutes, the coating solution which is initially clear and colorless turns hazy and starts to color (slightly blue in the case of TEOS). Shortly thereafter the solution becomes white and cloudy. The formation of colloids is presumably responsible for these visual changes. The thickness of the coating appears to reach a plateau (about 500–700 Å; 0.05–0.07 mm) after about 30 minutes and continued immersion does not lead to significant increases in bondability.

In a preferred embodiment of the invention a coupling agent which promotes or enhances adhesion between the primer coating and the bonding adhesive is included in the primer coating. Such coupling agents are well-known in the art and include organic compounds which contain reactive groups that covalently bond to the bonding adhesive employed. Illustrative of such coupling agents are organic compounds containing amino, acrylo, hydroxyl, halo and carboxyl groups. Coupling agents commonly employed in primers for metal to metal or metal to rubber bondings include, for example, 3-aminopropyltrimethoxysilane, 3-glycidoxypropyltrimethoxysilane, vinyltriethoxysilane, 3-mercaptopropyltriethoxysilane, 3-isocyanatopropyltriethoxysilane, bis(2-hydroxyethyl)-3-aminopropyltriethoxysilane, 2-chloroethylmethyldimethoxysilane, diethylphosphatoethyltriethoxysilane, N-(triethoxysilylpropyl)urea, N-[3-(triethoxysilyl)propyl]phthalamic acid, 3-(N-styrlymethyl-2-aminoethylamino)propyltrimethoxysilane.

Of course, the coupling agent selected in each instance will vary, depending upon the particular bonding adhesive and the substrate employed.

The preferred coupling agent is a dissimilar organometallic compound having a reactivity, as defined by its rate of hydrolysis and condensation in the coating solution, sufficiently less than that of the other hydrolyzable and condensable metal alkoxides in the coating solution which contains substituent groups that promote adhesion with the bonding adhesive. As a result of the differing reaction rates, it has been found that the most reactive of the organometallic compounds hydrolyze and condense to form a first thin coating layer, followed by formation of subsequent thin layers by hydrolysis and condensation of other organometallic compounds in the coating solution. The subsequent layers are formed substantially in decreasing order of the reactivities of the other organometallic compounds and since the hydrolyzable coupling agent organometallic compound is the least reactive it will form the last thin coating layer which constitutes the external layer of the primer coating.

The term "reactivity" as used herein and in the appended claims refers to the rate at which a particular metal alkoxide undergoes hydrolysis of the —OR groups to form —OH groups and subsequent condensation of the —OH groups to form a network of ceramic-type bonds.

The preferred coupling agents are metal alkoxides corresponding to the structure $R'_m—M—(OZ)_n$ wherein M, Z, m and n are as described above, and R' is a group that promotes adhesion with the bonding adhesive. Illustrative of suitable R' groups are: 3-aminopropyl; 4-aminobutyl; 3methacryloxypropyl; N-(2-aminoethyl - 3-aminopropyl); 3-chloropropyl; vinyl; 3-mercaptopropyl; 3-glycidoxypropyl; 3-isocyanatopropyl.

At least three factors are believed to account for the differences in reactivities of various metal alkoxides: (1) the type of metal to which the alkoxide groups are bonded, (2) the presence of non-alkoxide groups bonded to the metal, and (3) the type of alkoxide groups which are bonded to the metal. It has been found most desirable to control the reactivity of the metal alkoxides by varying the type of alkoxide groups which are bonded to the metal.

In general, with simple alkoxides such as —OR where R is lower alkyl of from 1-5 carbon atoms bonded to the metal, the reactivities of the alkoxides can be predicted by the size of the alkoxide. The size of the alkoxide affects reactivity for steric and electronic reasons which are known to one skilled in the art. The order of reactivity of simple alkoxides can be set forth as:

methoxy > ethoxy > isopropoxy > butoxy

Further control of reactivity can be achieved by varying the R' group bonded to the metal. Such R' groups comprise acetoxy and phenoxy groups, halides, hydrides, and hydroxyl groups and any other groups which do not adversely affect the novel characteristics of the present invention.

In the sol-gel coating solution of the present invention, the metal alkoxide which is the quickest to hydrolyze and condense will do so on the surface of the substrate. This is not to say that the other less reactive alkoxide species will not simultaneously hydrolyze and condense. However, the reactivities of any reacting species will be so different that the layer being formed at any given time is substantially composed of the reaction product of the most reactive species present in the coating solution. The chemical composition at a particular depth in the coating will, therefore, depend on the relative amounts of the reactive alkoxide in the sol-gel coating solution as well as the relative reactivities of the alkoxides present in the sol-gel coating solution. When the most reactive alkoxide has been substantially hydrolyzed and condensed as a coating, the composition of the subsequent coating layers formed will predominate in the condensation products of the next most reactive alkoxide, and so on in decreasing order of reactivity for the other alkoxides present, thereby resulting in a layered coating with the alkoxide containing the substituent which promotes adhesion constituting the outermost or external layer. Generally, there will be a gradual transition in composition between the various layers. The transition between the various layers can be made more distinct by incorporating metal alkoxides of widely differing reactivities. A large difference in reactivities between alkoxides will allow a more reactive alkoxide to substantially completely hydrolyze and condense prior to any substantial hydrolysis and condensation of a less reactive alkoxide species. In this case, the demarcation between coating layers will become more distinct.

Consider the reactions that take place when using a mixture of tetraethoxysilane (TEOS) and 3-aminopropyltriethoxysilane. The aminosilane is less reactive than TEOS because of the carbon atom attached to the silicon center. The lower reactivity of the aminosilane can be attributed in part to steric hindrance effects which arise because an aminopropyl group is larger than an ethoxy group. Another factor which can explain the lower reactivity of the aminosilane stems from electron donation from the carbon atoms of the aminopropyl group to the silicon atom. The partial positive charge of the silicon atom is thus reduced, thereby lowering the reactivity of the silicon center.

The first reactions to occur in such a solution will be the hydrolysis of the TEOS and aminosilane:

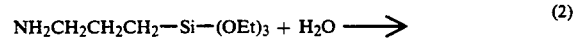

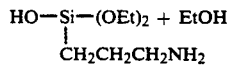

These reactions will, however, not occur at the same rate. The hydrolysis of TEOS will occur at a much greater rate than that of the aminosilane. The hydrolysis reactions can proceed, depending on the reaction conditions, until all of the alkoxides have been replaced.

The next reactions to occur involve the condensation of the hydroxyl-containing species to form metal-oxygen-metal bonds:

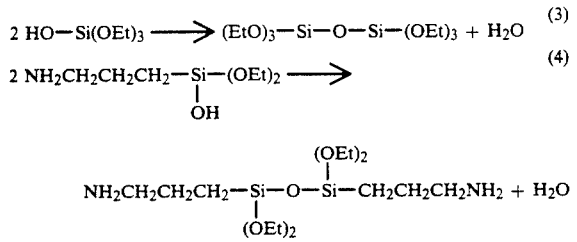

Further hydrolysis and condensation of the hydroxylated silane can proceed until all of the hydroxide groups have been used up, resulting in a network of ceramic-type bonds:

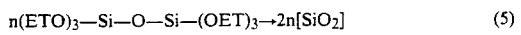

Similarly for the aminosilane:

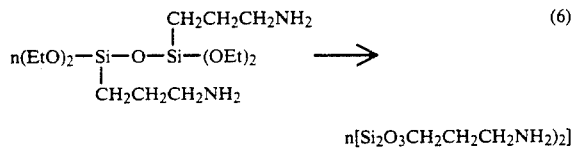

In a coating solution containing approximately equal molar quantities of TEOS and aminosilane (i.e., approximately equal volumes of each added to the coating solution), the reactivity of TEOS is approximately 10 times that of the aminosilane. Therefore, it is expected that initial condensation of the TEOS at the surface of say, an aluminum substrate, will occur at a rate of approximately 10 TEOS molecules condensed to 1 of the aminosilane molecules. As the more reactive TEOS is used up, the aminosilane condensation will begin to predominate. Thus, the final coated substrate will have a predominately aminosilane network as the outer layer of the coating.

A preferred coating solution, especially for preparing primers for use in rubber to metal bonding comprises a mixture of 5 to 90% hydrolyzable tetraalkoxides of silane having alkyl groups of 1 to 4 carbon atoms (e.g., TEOS) 5 to 90% by weight of an acrylo (including methacrylo) group-substituted alkoxysilane (e.g., 3-methacrylo oxy-propyltrimethoxysilane) and 5 to 90 % by weight of an aryl-substituted alkoxysilane (e.g., phenytriethoxysilane).

Bonding Adhesive

The bonding or covercoat adhesive component of the present invention can be any of the adhesives conventionally employed in metal to metal or rubber to metal bonding, as the case may be. The conventional adhesives include compositions containing thermosetting condensation polymers; polymers and copolymers of polar ethylenically unsaturated materials, halogenated rubbers, epoxy resins, phenoxy resins, polyisocyanates, polyurethanes and the like.

The invention exhibits particularly advantageous results in rubber to metal bonding when the covercoat is a halogenated polymer or rubber adhesive composition such as described, for example, in U.S. Pat. Nos. 3,258,388, 3,640,941, 3,282,883, 3,830,784, 4,119,587, all of which are hereby incorporated by reference.

Preferred rubber to metal bonding adhesives for use in the present invention are comprised of small halogen-containing polymers or rubbers containing small amounts of poly-C-nitroso aromatic compounds such as are described in U.S. Pat. No. 3,258,388. Particularly advantageous results in metal to metal bonding are obtained using commercial epoxy adhesives or urethane adhesives.

In the bonding operation of the invention, after the primer coating is applied to the metal or other surface as described above, it is preferably allowed to dry and the bonding or covercoat adhesive is applied thereover in a conventional manner. The applied bonding adhesive is then permitted to dry to remove the solvent, if any, therein. Normally, this may be done under ambient conditions, that is, room temperature, in about 30 to 40 minutes. The solvent evaporation rate can be increased by the use of heat, forced air or both.

The surfaces to be bonded are then brought together with the adhesive phase therebetween, and the adhesive cured under heat and sufficient pressure to insure intimate contact of the surfaces being bonded and the adhesive. The curing temperature will vary depending upon the particular bonding adhesive employed. Generally, curing can be accomplished at temperatures ranging from ambient to about 400° F. for a time commensurate with the temperature employed. The particular conditions selected may be dictated largely by the materials being bonded. For example, should an unvulcanized elastomer be bonded, in which case vulcanization (or curing) of the elastomer and curing of the adhesive will occur at the same time, conditions suitable for the vulcanization of the elastomer will be selected.

The following examples are given for purposes of illustration only and are not to be considered limiting.

EXAMPLE 1

Ethanol (70 parts by volume) is diluted with water (27 parts by volume) and concentrated ammonium hydroxide (3 parts by volume). Tetraethoxysilane, also known as TEOS (6 parts by volume), is then added and the solution is mixed vigorously for several seconds.

Aluminum 2024-T3 alloy coupons are immersed in this solution immediately after it is formulated and allowed to remain in the solution for one hour, after which they are withdrawn, rinsed briefly with ethanol and water and allowed to dry in air.

The resulting primer-coated coupons are then bonded together using Tyrite 7520, a commercial two-part urethane adhesive in a glue line of approximately 10 mil, and cured at ambient temperature for 24 hours.

For comparison, identical aluminum alloy coupons were similarly bonded together with Tyrite 7520 but without first coating the coupon with the primer coating.

When subjected to corrosion tests (i.e., 0.1 N NaOH solution) the aluminum alloy samples precoated with the primer coating of the invention corrode at a substantially slower rate than the unprecoated samples.

When subjected to lap shear tests the bonded aluminum alloy samples exhibit poorer adhesive strength. Neither retains any strength after exposure to boiling water for 24 hours.

TABLE 1

| Coating | Corrosion Rate (mg/min) | Adhesive Strength | |
|---|---|---|---|
| | | Initial | After Boiling Water |
| None | 0.7 | 990 | 0 |
| TEOS | 0.06 | 650 | 0 |

EXAMPLE 2

Aluminum 2024-T3 alloy coupons are pre-coated as described in Example 1, but using mixtures of TEOS and 3-aminopropyltrimethoxysilane instead of the TEOS alone.

The pre-coated aluminum coupons are then bonded together using Tyrite 7520 as in Example 1. In this example the joints made from metal samples treated with mixtures of silanes had significantly improved initial adhesion and retention of strength after exposure to boiling water, compared to joints made from untreated samples. The results are shown in Table 2.

TABLE 2

| Coating | Adhesive Strength (kg) | |
|---|---|---|
| | Initial | After Boiling Water |
| None | 990 | 0 |
| Aminosilane (100%) | 1180 | 600 |
| TEOS (5%) + Aminosilane (50%) | 1140 | 440 |
| TEOS (83%) + Aminosilane (17%) | 1240 | 550 |
| TEOS (95%) + Aminosilane (5%) | 1040 | 390 |
| TEOS (98%) + Aminosilane (2%) | 800 | 220 |
| TEOS (100%) | 650 | 0 |
| Two Coatings: TEOS (100%) then Aminosilane (100%) | 960 | 670 |

Glass microscope slides were cut to convenient sizes (0.5 × 3 cm) and cleaned prior to aluminum evaporation. Cleaning involved scrubbing the surfaces with soap (Liquinox) and water, followed by sonication in soap and water for 15 minutes, rinsing 6 times in distilled water, sonication 10 minutes in acetone (or isopropanol), and drying under a stream of prepurified nitrogen piped through poly(tetrafluoroethylene) tubing. The slides were then immediately put into a vacuum chamber.

Evaporation of aluminum wire (Balzers 99.9%) or iron rod Balzers 99+%) was carried out at $5 \times 10^{-7}$ to $5 \times 10^{-6}$ torr (the pressure increased slightly during evaporation of aluminum, and significantly during evaporation of iron). Approximately 1000 Angstroms was deposited at 5 Angstroms per second. The vacuum chamber was then backfilled with hydrocarbon free ultra-high purity oxygen (99.99%; a procedure which took approximately 5 minutes). The slides with evaporated metal mirrors were immediately removed from the chamber with poly(tetrafluoroethylene)-coated tweezers and, within 10 minutes, were immersed in a sol-gel solution prepared as follows:

The aluminum coated slides were immersed in the solutions identified in Table 3 immediately after they were formulated and allowed to remain in the solution for one hour, after which it was withdrawn, rinsed briefly with ethanol and water, and oven-baked for one hour at 100° C.

The aluminum/glass slide samples thus-treated were subjected to a corrosion test which comprised exposing the samples to highly corrosive 0.1N NaOH. The time required to fully corrode as defined by the disappearance of the metal mirror was noted. The results are reported in Table 3 below wherein "Rate 1" defines the rate of corrosion for untreated samples to fully corrode.

TABLE 3

| Coating | Relative Corrosion Rate in 0.1N NaO14 |
|---|---|
| None | 1 (by Definition) |
| Aminosilane (100%) | 0.6 |
| TEOS (50%) + Aminosilane (50%) | 0.02 |
| TEOS (75%) + Aminosilane (25%) | 0.004 |
| TEOS (92%) + Aminosilane (8%) | 0.005 |
| TEOS (95%) + Aminosilane (5%) | 0.002 |
| TEOS (100%) | 0.002 |

While none of the joints made from mixtures of silanes performed dramatically better in adhesion tests than those using the coupling agent alone, it is evident from Tables 2 and 3 that mixtures can perform comparably in adhesion tests while performing better in other types of tests (e.g. corrosion prevention).

EXAMPLE 3

The experiment of Example 2 was repeated using titanium and brass samples. The results of the lap shear tests are reported in Table 4.

TABLE 4

| Metal | Coating | Adhesive Strength | |
|---|---|---|---|
| | | Initial | After Boiling Water |
| Brass | None | 760 | 330 |
| | TEOS (50%) + Aminosilane (50%) | 1430 | 1230 |
| | Aminosilane (100%) | 1630 | 1500 |
| Titanium | None | 580 | 570 |
| | TEOS (50%) + Aminosilane (50%) | 1820 | 1510 |
| | Aminosilane (100%) | 1700 | 1340 |

EXAMPLE 4

Aluminum 2024-T3 alloy coupons were coated with mixtures of TEOS and 3-glycidoxypropyltrimethoxysilane in the manner of Example 1 for 24 hours.

The 1" lap shear joints were made using Fusor 312 cured at 100° C. for 1 hour and cooled prior to testing. Some of the joints were exposed to boiling water for 2 hours prior to testing. The results of the test are reported in Table 5.

TABLE 5

| Treatment | Adhesive Strength (kg) | |
|---|---|---|
| | Initial | After Boiling Water |
| None | 870 | 650 |
| Glycidoxysilane (100%) | 1510 | 1220 |
| TEOS (95%) + Glycidoxysilane (5%) | 1470 | 1150 |
| TEOS (98%) + Glycidoxysilane (2%) | 1290 | 870 |

EXAMPLE 5

Example 4 was repeated using Fusor 310 and the lap shear strengths of the resulting bonded samples were compared to professionally treated samples of steel (CR1010 alloy). The test results are reported in Table 6.

TABLE 6

| Metal | Coating | Adhesive Strength (kg) | |
|---|---|---|---|
| | | Initial | After Boiling Water |
| Steel (CR1010) | None | 1050 | 420 |
| | Glycidoxysilane (100%) | 1320 | 910 |
| | TEOS (95%) + Glycidoxysilane (5%) | 1250 | 960 |
| Steel (CR1010) | Phosphatized | 1210 | 950 |

EXAMPLE 6

Aluminum (2024-T3) alloy coupons were treated with silanes in the manner of Example 1 for 24 hours. The samples were then coated with a commercial rubber to metal bonding adhesive (Chemlok 220) and bonded to rubber. In comparison samples were also made up using three different commercial primers for rubber/metal bonding adhesives, i.e. Chemlok 607, AP-133 and Chemlok 205. The samples were then exposed to boiling water for 2 hours under stress. If the samples survived the boiling water test (i.e., did not spontaneously fail) they were treated for strength in a peel test apparatus. The results are reported in Table 7.

TABLE 7

| Coating | Test Results |
|---|---|
| None | Spontaneous failure |
| TEOS (33%) + PTES (33%) + MPTS (33%) | No failure, pull strength 43 lbs. |
| TEOS (50%) + PTES (0%) + MPTS (50%) | Spontaneous failure |
| TEOS (0%) + PTES (50%) + MPTS (50%) | Spontaneous failure |
| TEOS (0%) + PTES (100%) + MPTS (0%) | Spontaneous failure |
| TEOS (0%) + PTES (0%) + MPTS (100%) | Spontaneous failure |
| TEOS (100%) + PTES (0%) + MPTS (0%) | Spontaneous failure |
| Chemlok 607 commercial primer | Partial spontaneous failure, pull strength 37 lbs. |
| AP 1-33 commercial primer | Partial spontaneous failure, pull strength 29 lbs. |
| Chemlok 205 commercial primer | Partial spontaneous failure, pull strength 34 lbs. |

PTES = Phenyltriethoxysilane
MPTS = methacryloxypropyltrimethoxysilane

EXAMPLE 7

Steel (CR 1010) samples were treated with mixtures of silane in the manner of Example 1. The samples were then coated with primer (Chemlok 205), then adhesive (Chemlok 220) and bonded to rubber. The rubber to metal joints were then exposed to boiling water under stress for either 12 or 65 days. After removal from the water the degree of spontaneous failure was noted. The results are reported in Table 8.

TABLE 8

| Coating | % Spontaneous Failure | |
|---|---|---|
| | 12 days | 65 days |
| None | 40 | 100 |
| TEOS (50%) + PTES (17%) + MPTS (33%) | 10 | 75 |
| TEOS (67%) + PTES (0%) + MPTS (33%) | 10 | 95 |
| TEOS (50%) + PTES (0%) + MPTS (50%) | 20 | 95 |
| Phosphatized | 0 | <75 |

We claim:

1. In a method for bonding a metal substrate to a similar or dissimilar substrate wherein a primer coating is first applied to the metal substrate surface and the metal substrate is then bonded to the similar or dissimilar substrate with a bonding adhesive, the improvement wherein at least part of the primer coating is comprised of a uniform, ultrathin film formed by immersing, prior to said bonding, the metal substrate in a solution comprising from about 0.0001 to 30 parts by volume of at least one hydrolysable metal alkoxide of a polymer network-forming cation, from about 1 to 60 parts by volume of water, from about 20 to 95 parts by volume of an organic solvent and from about 0.01 to 3 parts by volume of a base, said solution having undergone substantially no polymer growth and said metal substrate being immersed in said solution within no more than about ten minutes after formation of said solution, for a time sufficient to form in situ said film on said substrate.

2. The improvement according to claim 1, wherein the solution comprises at least one hydrolyzable silicon alkoxide, water, alkanol and ammonium hydroxide.

3. The improvement according to claim 2, wherein the silicon alkoxide is tetraethoxysilane and the alkanol is ethanol.

4. The improvement according to claim 1, wherein the metal alkoxide is octadecyltriethoxysilane.

5. The improvement according to claim 1, wherein the metal alkoxide is phenyltriethoxysilane.

6. The improvement according to claim 1, wherein the metal alkoxide is butyltriethoxysilane.

7. The improvement according to claim 1, wherein the pH of the solution is about 7 to 10.

8. The improvement according to claim 1, wherein the substrates bonded together are both metal substrates.

9. The improvement according to claim 1, wherein a metal substrate is bonded to a rubber substrate.

10. The improvement according to claim 1, wherein a metal substrate is bonded to a polymeric substrate.

11. The improvement according to claim 1 wherein said solution further contains a dissimilar hydrolyzable and condensable organometallic compound of a polymeric network-forming cation, wherein the organo moiety of said dissimilar compound promotes adhesion to said bonding adhesive, the dissimilar organometallic compound in said solution having a reactivity, defined by the rate of hydrolysis and condensation, sufficiently less than said other hydrolyzable metal alkoxide in said solution, so that it is the last to hydrolyze and condense and to thereby form a thin coating that constitutes the external layer of said primer coating, said organometallic compound having an organo moiety which promotes adhesion with said bonding adhesive having the least reactivity of said organometallic compounds so that it is the last layer formed.

12. The improvement according to claim 11, wherein the bonding adhesive is selected from the group consisting of an acrylic, urethane and epoxy adhesives.

13. The improvement according to claim 12, wherein the dissimilar organometallic compound is an acryloxyalkyltrialkoxysilane.

14. The improvement according to claim 13, wherein the acryloxyalkytrialkoxysilane is methacryloxypropyltriethoxysilane.

15. The improvement according to claim 11, wherein the bonding adhesive is an epoxy adhesive.

16. The improvement according to claim 11, wherein the bonding adhesive is a halogenated rubber adhesive.

* * * * *